United States Patent
Jenkins

(10) Patent No.: US 6,527,440 B1
(45) Date of Patent: Mar. 4, 2003

(54) OPTICAL POWER GENERATOR SYSTEM CONDITION STATUS INDICATOR AND METHODS OF INDICATING SAME

(75) Inventor: Maurice A. Jenkins, Casselberry, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 59 days.

(21) Appl. No.: 09/651,937

(22) Filed: Aug. 31, 2000

(51) Int. Cl.$^7$ .......................... G01K 11/00; G01K 1/00
(52) U.S. Cl. .................. 374/161; 374/162; 374/152
(58) Field of Search ................... 374/161, 162, 374/152, 121, 130, 132

(56) References Cited

U.S. PATENT DOCUMENTS

| | | | |
|---|---|---|---|
| 3,704,625 A | * 12/1972 | Seto et al. | 374/162 |
| 4,016,761 A | * 4/1977 | Rozzel et al. | 374/161 |
| 4,203,326 A | 5/1980 | Gottlieb et al. | 73/339 |
| 4,307,607 A | 12/1981 | Saaski et al. | |
| 4,364,032 A | 12/1982 | Narato et al. | 340/679 |
| 4,409,476 A | * 10/1983 | Lofgren et al. | 374/161 |
| 4,733,225 A | 3/1988 | Uematsu et al. | 340/584 |
| 4,818,975 A | 4/1989 | Jenkins | 340/584 |
| 4,902,139 A | * 2/1990 | Adiutori | 374/137 |
| 4,906,107 A | * 3/1990 | Luukkala | 374/161 |
| 5,128,535 A | * 7/1992 | Bock et al. | 250/227.21 |
| 5,211,478 A | * 5/1993 | Horsley | 374/125 |
| 5,376,793 A | * 12/1994 | Lesniak | 250/341.8 |
| 5,550,629 A | 8/1996 | Shapanus et al. | 356/72 |
| 6,014,076 A | 1/2000 | Luzzader | 340/521 |
| 6,079,875 A | * 6/2000 | Klass et al. | 374/130 |

FOREIGN PATENT DOCUMENTS

| | | | | |
|---|---|---|---|---|
| DE | 3407911 | * | 9/1985 | 250/338.1 |
| FR | 2319120 A | | 2/1977 | |
| JP | 0122124 | * | 9/1980 | 374/161 |
| JP | 0079928 | * | 6/1981 | 374/161 |
| JP | 0079416 | * | 5/1982 | 374/161 |
| JP | 58014021 A | | 1/1983 | |
| JP | 0115333 | * | 7/1983 | 374/161 |
| JP | 0153133 | * | 9/1983 | 374/161 |
| JP | 0162824 | * | 9/1983 | 374/161 |
| JP | 0042432 | * | 2/1988 | 374/161 |
| SU | 0922538 | * | 4/1982 | 374/161 |
| SU | GB2209830 | * | 5/1989 | 374/161 |

* cited by examiner

Primary Examiner—Christopher W. Fulton
Assistant Examiner—Gail Verbitsky

(57) ABSTRACT

An apparatus and method to monitor temperature variation in electrical system generator components is provided. A temperature probe comprising temperature information conveyor that directly transfers temperature variation information to a temperature-sensitive light window is utilized. A pair of light guides can be employed, wherein the first conveys light to the light window from a light source, and light passing from the window is captured by the second light guide and conveyed to a light sensor. Within preselected temperature ranges light passes through the window, but pre-specified temperature variations will close the window thereby blocking the light so as to signal a critical temperature variation has occurred. The temperature information conveyor is chosen so as to have definite properties in terms of a heat conductivity coefficient to promote rapid, direct conveyance of temperature variation information. It further can be formed to enhance the speed and efficiency of temperature information conveyance. The apparatus and methods permit any selected component or portion of an electrical generator system to be monitored. Moreover, multiple components can be monitored simultaneously.

11 Claims, 4 Drawing Sheets

OPTICAL POWER GENERATOR SYSTEM CONDITION STATUS INDICATOR AND METHODS OF INDICATING SAME

FIELD OF THE INVENTION

This invention is related to the power generation industry and, more particularly, to the field of monitoring conditions of electrical generator systems.

BACKGROUND OF THE INVENTION

In the power generation industry, monitoring the conditions of components of electrical generator systems can be critical to the efficient and nonhazardous functioning of such systems. Effective monitoring encompasses detecting and registering conditions in various components including generators, exciters, collectors and large utility transformers. Conventional techniques for monitoring the temperature of such components use thermocouples or resistance temperature detector devices which convey temperature information with conductors. Such devices and techniques, however, are limited and suffer from several deficiencies. For example, these devices cannot be routed across components operating at high voltage or where there is the risk of flash-over and emf distortion. The ability to measure accurately the temperature of a component is thus further limited because temperature measuring devices cannot be positioned in proximity to critical areas whose temperatures it is desirable to monitor. Therefore, critical areas cannot be monitored well using these conventional devices and methods.

These limitations on condition monitoring, moreover, often necessitate monitoring by visual means, which, in turn, can require that visual inspections be scheduled at periodic intervals with any attendant costs associated with the downtime of the electrical generator system that may be necessitated while such inspections are performed. Moreover, because such visual monitoring can only be undertaken at intermittent intervals, there is no capability for substantially continuous monitoring of electrical system components. Thus, such conventional techniques and devices suffer deficiencies in terms of both efficiency and efficacy in the sense that they are costly if there is necessary downtime of the system and are inevitably less reliable when they can only be effected on a limited basis rather than continuously.

Other devices and methods have been tried for certain types of components, but these also suffer from other limitations and deficiencies. For example, U.S. Pat. No. 4,818,975 by Jenkins titled "Generator Stator Core Temperature Monitor" proposes measuring ambient temperature of the stator core of a generator in terms of hydrogen gas ($H_2$) exiting through the stator core. Temperature of the core can be inferred from either of two effects: (1) the hotter the gas, the more frequent the gas molecules impinge on a temperature-responsive liquid crystal so as to block monitored light; and (2) the hotter the gas, the greater the expansion of a housing-mounted flexible bladder thereby influencing the angle and hence amount of light detected. There are at least two serious limitations with this type of monitoring, however. First, owing to the relative diffusion of gas molecules, gas is a less efficient heat conductor. Accordingly, the hydrogen gas is a less efficient, less reliable conveyor of temperature information. Second, and more fundamentally, this type of monitoring measures only an aggregate or average temperature of the environment surrounding the stator, not the actual temperature of a specific system component. This can be especially limiting given the obvious need to detect and isolate a temperature variation occurring in individual components. Measuring ambient temperature does not permit separable monitoring and detecting temperature variation in individual components. Detection, moreover, is obviously delayed until, for example, an overheating condition in a single component contributes sufficient heat to raise the average or ambient temperature surrounding the stator or other electrical system.

U.S. Pat. No. 4,203,326, by Gottlieb et al. titled "Method and Means for Improved Optical Temperature Sensor" proposes an "optical conductor" to measure temperature, but does not address directly the problems of the more conventional type conductor temperature information conveyors. Such devices combine an optical core with cladding along with a jacket to encase the core and clad material. The core and clad material are formed so as to produce a temperature-influenced difference in refractive indexes that is intended to overcome a common problem with such conductors: temperature responsiveness varies linearly with the length of the conductor. But whatever deficiencies may be corrected with respect to this conductor-length factor, such a device registers only a temperature range and does not address other problems described above. Moreover, there are additional limitations inherent in such devices that limit the efficiency with which temperature detection can be performed. First, thermal disruption of the fiber conductor by melting in the fiber or surrounding cladding disturbs light conduction. Although using different cladding material can compensate for this risk, doing so can further complicate choosing a proper material composition that will provide the correct refractive indexes difference to accurately monitor for temperature variation. Finally, in addition to their above-described complications in achieving a desired result, such devices also are fundamentally limited in the result that is achieved. Specifically, such devices provide detection of only a range of temperatures, thereby providing less-than-desirable accuracy and problematic delay in monitoring for critical conditions like overheating in an electrical system component.

There is thus a critical need for an apparatus or method that overcomes the problems inherent in conventional and optical conductor type devices for monitoring electrical generator components. Specifically, there is the need for a device or method that more accurately, more efficiently, and more simply detects and isolates temperature variations in the components of electrical generator systems.

SUMMARY OF THE INVENTION

In view of the foregoing background, the present invention advantageously provides an apparatus and method for efficiently and efficaciously monitoring the temperature of electrical generator system components in the presence of such inhibiting factors as high voltage and flash-over risk. The present invention provides a more accurate capability for monitoring temperature and detecting temperature variation in electrical system components. Moreover, although the apparatus and method are described herein in the context of electrical generator systems, they have wide applicability in other contexts as will be apparent to one skilled in the relevant art. Such uses include monitoring air conditioning systems and other building service devices whose temperatures need to be monitored effectively and efficiently on a substantially continuous basis. Specifically, as described herein, vital temperature information using the apparatus and method of the present invention is directed efficiently and rapidly to a temperature variation monitor so as to monitor critical temperature variations in a direct, efficient, and reliable manner.

Further advantage is provided in that critical temperature information can be conveyed from within the system to a remote site. This provides capabilities for safe, continuous temperature monitoring using the apparatus and method of the present invention. Notwithstanding this significant advantage, the present invention can be used just as effectively for direct local monitoring of a system component's temperature.

The present invention, moreover, specifically provides the capability of strategically positioning a plurality of temperature monitoring devices or "probes" at any number of selected critical areas within an electrical generator system. This provides capabilities for monitoring and detecting temperature variations of a plurality of discrete components within the system as opposed to only measuring an average temperature in the form of ambient temperature of the overall system. Again, the present invention permits multiple component monitoring from a remote location external to the electrical generator system as well as direct, on-site temperature monitoring.

The apparatus and method of the present invention provide an effective, efficient temperature probe that preferably includes a light source, a light sensor, a light window, and an associated pair of light guides along with a direct temperature information conveyor in the form of a thermal conductor linking the light window with the electrical system component whose temperature is to be directly monitored. More specifically, the light source and light sensor can be positioned outside of the electrical generator system, while the light window is positioned within the system at any selected critical area. A light guide conveys light from the light source to the light window. The light window is responsive to temperature and receives temperature information directly and virtually instantaneously from a thermal conducting connector in communication with a surface of the component whose temperature is to be monitored. Within a preselected temperature range deemed to be acceptable, for example, the light window remains transparent, but if the temperature falls within a preselected critical range, the window responsively becomes opaque and blocks the light that otherwise would have been captured by the second light guide to be conveyed to the light sensor.

Thus, a specific advantage of the present invention is the ability of the heat conductor to convey accurate and ready temperature information. The conductor is in direct contact with a surface portion of the select component whose temperature is to be monitored. The temperature so measured is that of the specific component rather than an aggregate or average of the system, as taught by existing conventional and optics-based devices.

Whereas other methods and devices detect variation in ambient temperature by registering increased or more rapid average impingement of gas molecules on the surface of a liquid crystal to raise the temperature of the crystal, the present invention uses a heat conductor having high thermal conductivity. More specifically, recognizing that temperature information is transferred more rapidly through a medium having a fixed structural arrangement, the present invention employs a thermal conducting medium that preferably is a metal or other medium having a sufficiently high coefficient of heat conduction. Thus, the translational (or kinetic), rotational, and vibrational energy is transmitted more rapidly and exchanged more efficiently with a temperature-sensitive liquid crystal device. This, then, increases the speed and accuracy with which temperature information can be conveyed, as noted above. Thus the present invention in contrast to other devices and methods allows earlier and more accurate detection of temperature variation in electrical system components.

As also noted above, a further, albeit related, advantage stemming from use of a light window directly connected via a thermal conducting medium to the component, is that the temperature of the component itself is conveyed rather than a proxy in the form of the ambient or system environment temperature. Again, the temperature information conveyed is accordingly more accurate because the heat conductor can preferably be a metal, and moreover, the temperature information is conveyed rapidly as compared to conventional and other optics-based devices.

Yet a further advantage is provided by using the light guides described above, which can enable the routing of the temperature probes across virtually any component without the concerns of high voltage or flash-over that would otherwise arise with conventional devices and methods. In a related vein, the lightweight light guides and light window of the apparatus and method thus ensure a lighter assembly as compared to conventional temperature monitoring devices, providing an additional advantage where weight is a critical factor such as in aerospace and other non-land based applications.

Moreover there is the ability, as also noted above, to do so for a multiple of distinct temperature probes. These features, then, help enable the additional advantage of measuring distinct components within the same electrical generator system. Therefore, because distinct temperature information rather than an aggregate is conveyed for each selected component, the individual components can be simultaneously monitored within the same electrical generator system, whereas with conventional devices and methods there is no capability for distinguishing which of several components is contributing what temperature to the overall system temperature. This feature thus permits discrete, simultaneous monitoring of multiple components—generator, exciters, collectors, transformers, etc.—and provides capabilities for singling out with early detection which, among the various components, may be creating a system problem in the form of a temperature variation.

BRIEF DESCRIPTION OF THE DRAWINGS

Some of the features, advantages, and benefits of the present invention having been stated, others will become apparent as the description proceeds when taken in conjunction with the accompanying drawings in which.

DETAILED DESCRIPTION OF PREFERRED EMBODIMENTS

The present invention will now be described more fully hereinafter with reference to the accompanying drawings, in which preferred embodiments of the invention are shown. This invention may, however, be embodied in many different forms and should not be construed as limited to the illustrated embodiments set forth herein. Rather, these illustrated embodiments are provided so that this disclosure will be thorough and complete, and will fully convey the scope of the invention to those skilled in the art. Like numbers refer to like elements throughout, and prime and double prime notation, if used, indicate similar elements in alternative embodiments.

Figure 1:
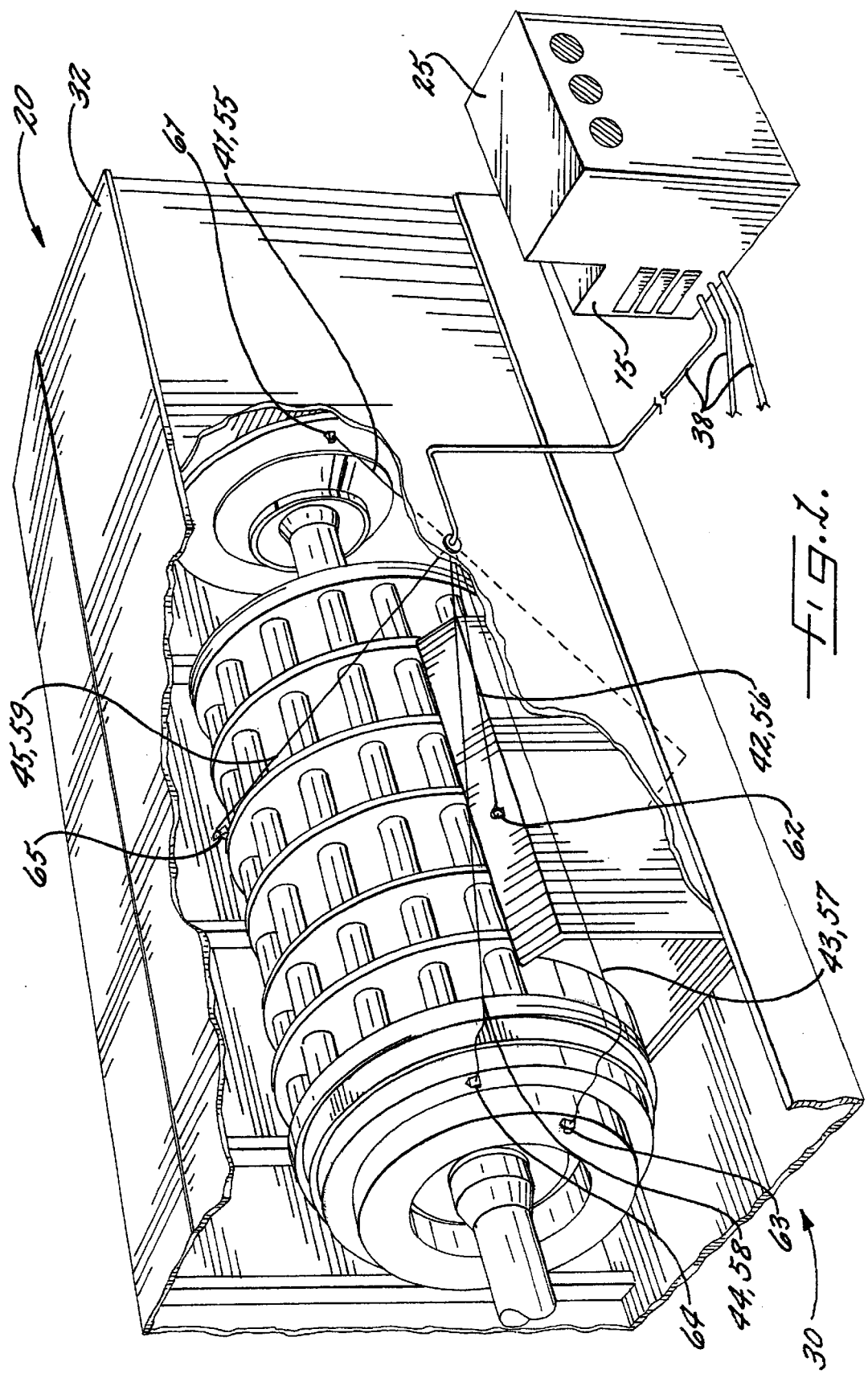
FIG. 1 is a perspective view of an apparatus to monitor temperature of distinct components of an electrical generator system according to the present invention.

FIG. 1 illustrates an apparatus 20 for monitoring the condition of an electrical generator system 30. Specifically, the apparatus 20 is capable of monitoring each of the distinct components of the system 30, and more specifically to detect overheating of the generator, exciters, collectors, transformers, or portions thereof that may make up the particular system.

Figure 2:
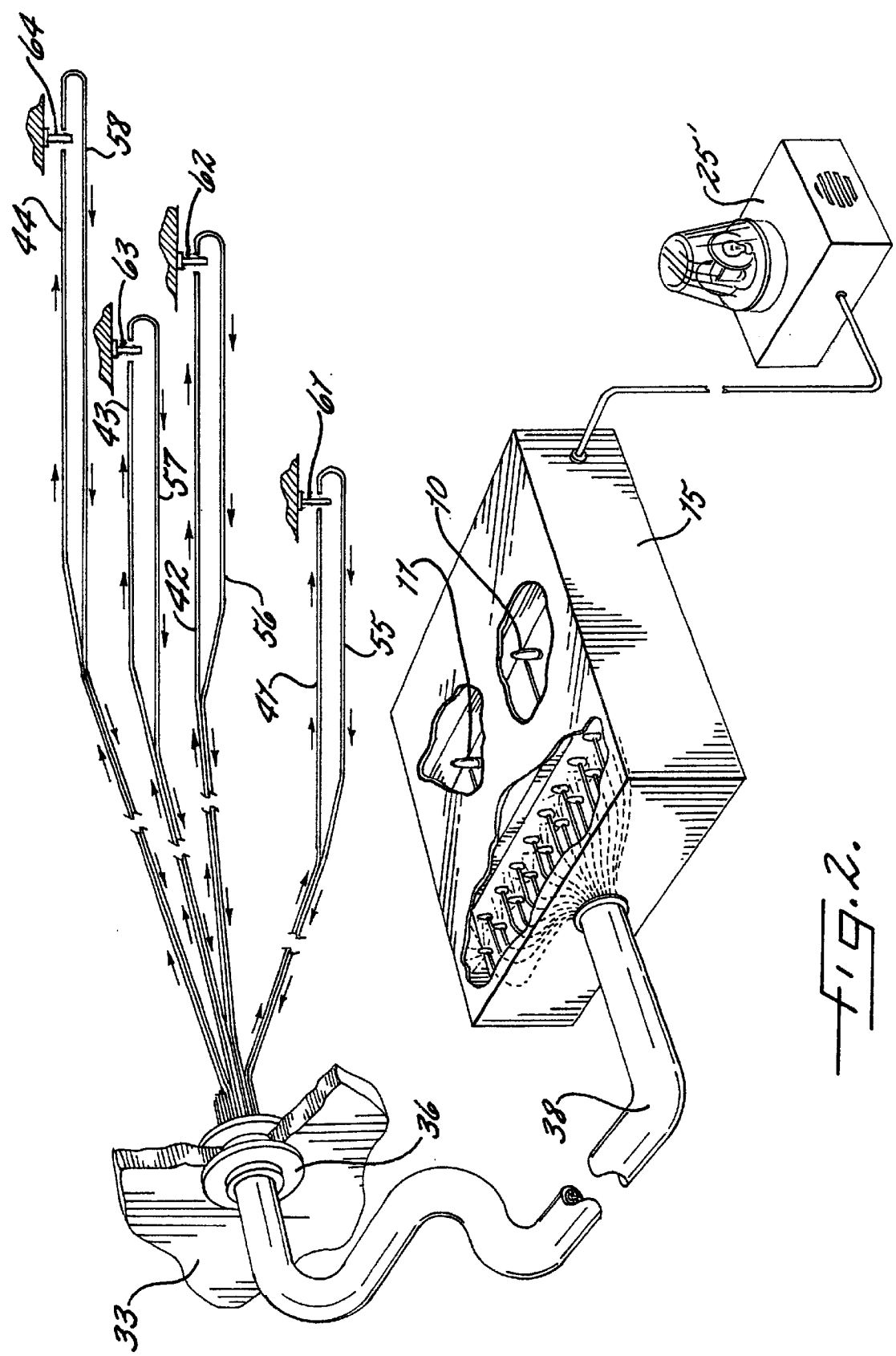
FIG. 2 is a fragmentary sectional view of a temperature probe configuration and control system according to the present invention.

The apparatus 20 as illustrated may include a light source 10, represented herein within a housing 15 external to and adjacent the electrical generator system (See FIGS. 1 and 2). As will be understood by those skilled in the art, the light source 10 can be provided efficiently by one or more light emitting diodes (LEDs). The light source 10 preferably provides a continuous stream of light or intermittent light signals. As perhaps best shown in FIG. 2, the resultant light is conveyed by one of a plurality of first light guides 41, 42, 43, 44 from the light source 10 to a corresponding one of a plurality of light windows 61, 62, 63, 64. As illustrated, the light guides preferably extend through a surface portion 33 of the exterior surface 32 of a housing of the electrical generator system 30 at a critical seal area 36. Moreover, the light guides preferably are provided by one or more fiber optic strands bundled within a casing 38 and fed into the electrical generator system 30, wherein each fiber optic strand individually extends to one or more light windows 61, 62, 63, 64, 65 adjacent each system component whose temperature is to be monitored (FIG. 1).

The one or more first light guides 41, 42, 43, 44, 45 each preferably has a first end adjacent the light source 10 within the housing 15 positioned external to the generator system 30 and extend to a position within the generator system 30 where a second end is positioned adjacent a corresponding light window 61, 62, 63, 64, 65 (FIGS. 1 and 2). Any light passing through a light window 61, 62, 63, 64, 65 is captured by a corresponding second light guide 55, 56, 57, 58, 59 having a first end positioned adjacent the corresponding light window 61, 62, 63, 64, 65 and extending from the electrical generator system to a light sensor 11 external to or positioned outside of the electrical generator system 30 where the captured light is conveyed at a second end of the light guide to the sensor 11, illustrated herein as also contained in the external housing 15.

The apparatus 20 described thus, preferably includes at least one combination of a light source, a light sensor, a light window and an associated pair of light guides, defining a temperature probe that may be positioned at any selected locations within an electrical generator system 30. Each combination, or temperature probe, functions with the first light guide conveying light from the external light source to the light window positioned within the electrical generator system and a second light guide capturing any light passing through the corresponding light window so as to convey the captured light to a light sensor external to the system. Thus, each discrete combination of light source, light sensor, light window, and light guide pair provides a unique temperature probe which can be placed anywhere within the electrical generator system 30 to provide temperature detecting capabilities that can be monitored from a location external the electrical generator system. Moreover, the apparatus may also include a light signal processor 25 in communication with the light sensor 11 (FIG. 1). The inclusion of the processor augments the advantages of the apparatus, especially if multiple temperature probes are employed such that the processor can indicate, as in the manner fully described below, which component of the total electrical generator system 30 is within which of a pre-selected set of temperature ranges. As will be understood by one skilled in the art, the processor can be a programable computer programmed to respond to temperature variations. Alternatively, a more simple device can include a warning light 25' that is activated when a temperature variation is detected (FIG. 2).

Figure 3:
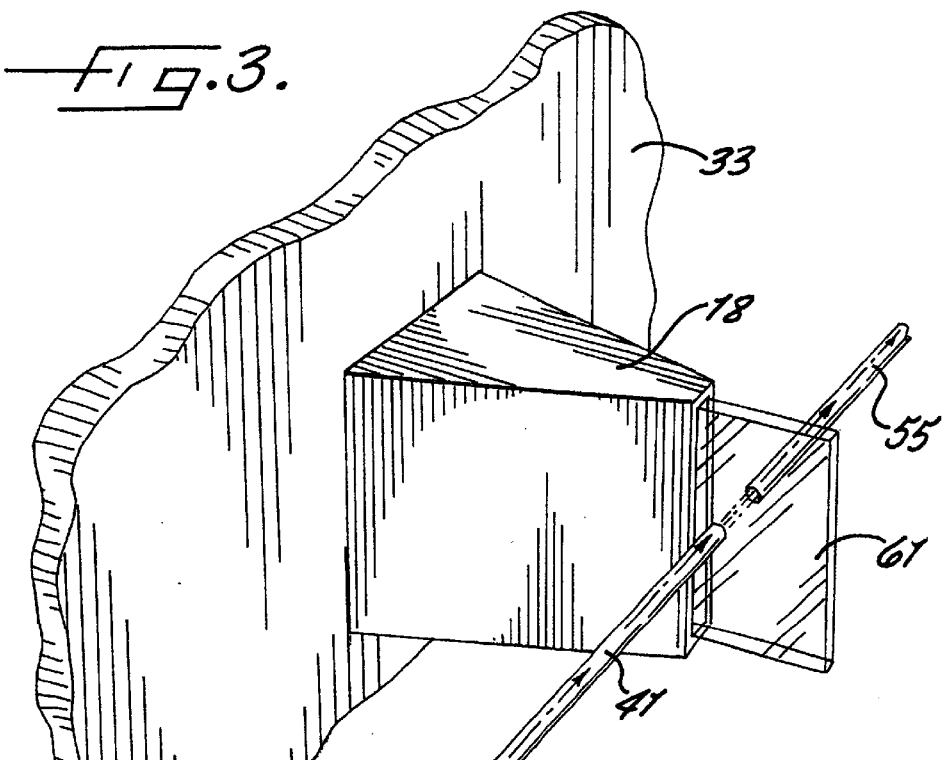
FIG. 3 is a fragmentary perspective view of a light window with heat conducting frame connected to a component of an electrical generator system according to the present invention.
Figure 4:
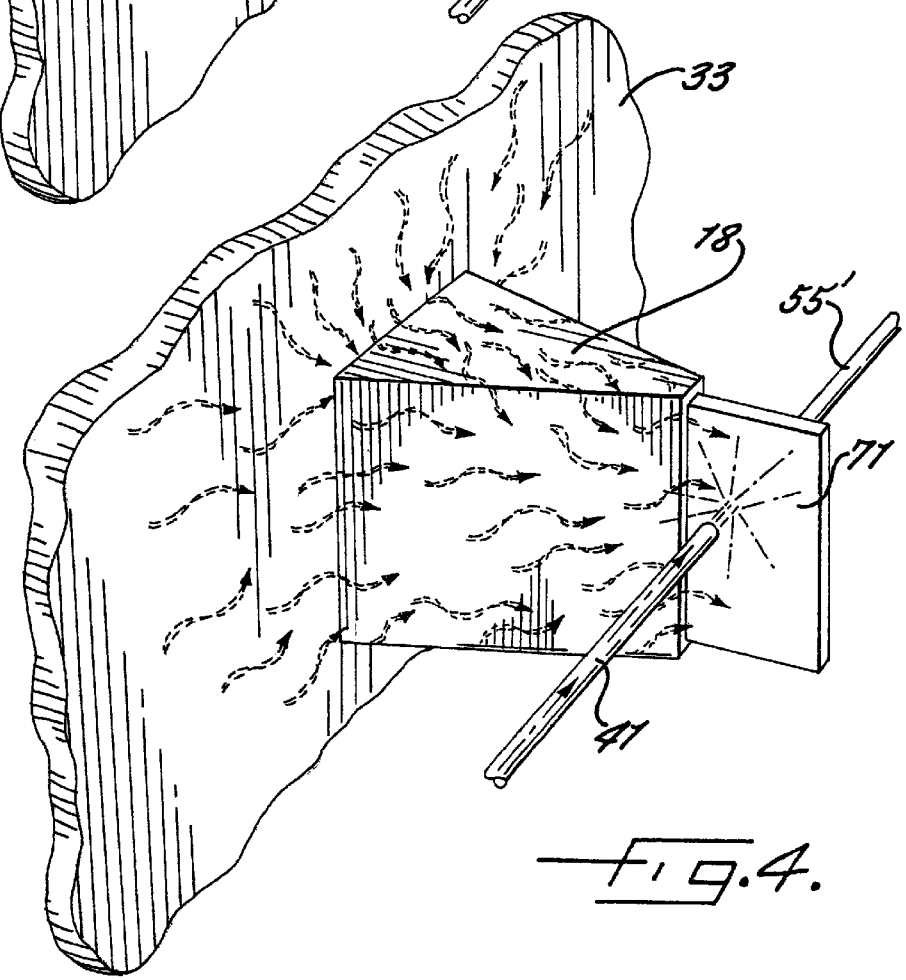
FIG. 4 is a fragmentary perspective view of a light window with heat conducting frame connected to a component of an electrical generator system according to the present invention.

FIGS. 3–6 illustrate the functioning of an individual light window 61, 71 and its corresponding pair of light guides, 41, 55. Illustrating one embodiment of the present invention, FIGS. 3 and 4 show the light window 61, 71 supported within a frame 18 connected to a portion 33 of the specific electrical generator system component whose temperature is to be monitored. The frame 18 has the property that it conducts heat to the light window 61, 71. The light window is responsive to temperature such that when the heat transfer rises to a sufficient level the light window which otherwise is transparent 61 (FIG. 3) becomes opaque to light 71. Light passing through the window 61 at one temperature is blocked when the temperature of the window is within a different range causing the window to be opaque 71. Therefore, light that is conveyed by the first light guide 44 and captured by the second light guide 55 when the window is transparent 61 is blocked when the window is opaque 71.

As described above, each discrete combination of light source, light sensor, light window, and pair of light guides provides a unique temperature probe. One of the unique advantages of the present invention over conventional devices is that any of the multiple temperature probes can be placed anywhere within the electrical generator system 30 to provide temperature monitoring capabilities external to the system 30. More specifically, while the temperature probe is positioned within the system, the light source and sensor can be maintained external to the system 30. This permits safe and efficient temperature monitoring of components that can be difficult to reach or even hazardous to monitor directly. The apparatus thus permits efficient and effective monitoring from virtually any distance, at virtually any remote location.

Referring again to FIGS. 1 and 2, such strategic positioning of individual temperature probes within the electrical generator system 30 can be accomplished, in part, by extending the light guides from the external source through specific points 36 in portions of the electrical generator system housing or stator 32. More specifically, strategic temperature monitoring can be effected by mounting first and second fiber optic strands 41, 42, 43, 44, 45 and 55, 56, 57, 58, 59 inside the generator ventilation circuits and near critical seal areas of the system 30 as illustrated.

Yet another significant advantage over conventional temperature monitoring methods associated with electrical generator systems is that the individual temperatures of each discrete component of any set of components of a system can be separably monitored. Whereas conventional devices measure an average or ambient system temperature, the present invention permits temperature monitoring of the distinct components of the system. This advantage is enabled by providing capabilities for multiple temperature probes that can be positioned adjacent any selected system component surface.

A critical advantage of the present invention lies in the manner in which temperature information is transferred from an electrical system component to the light window. Conventional and other optics-based devices and methods rely on gas to transfer heat to a liquid crystal. Although gas molecules, of course, exhibit the well-understood translational (kinetic), rotational, and vibrational molecular energy characteristics that enable them through interaction (collision) with the liquid crystal molecules to transmit heat, the gas molecules are simply too diffuse to make the gas a good thermal conductor. (Serway, Physics, $4^{th}$ ed., 1998, pages 566–569; see also Sonntag, Borgnakke, and Van Wylen, Fundamentals of Thermodynamics, $5^{th}$ ed., 1998; pages 84–85.) Recognizing this problem, the present invention overcomes it by providing direct transfer of temperature information (energy) between the light window (preferably, a liquid crystal) and the electrical system component by bridging the two with an efficient thermal conductor. Specifically, a heat conducting material is chosen to have at least a semi-fixed, or preferably, fixed molecular structure so as to focus and channel the energy transference such that temperature information is transferred more rapidly and more efficiently to the light window.

More specifically, the specific properties of such a heat conductor are perhaps best described quantitatively in terms of Fourier's law of heat conduction:

$$\dot{Q} = -kA\frac{dT}{dx},$$

giving the rate of heat transfer as proportional to the heat conductivity, k, of the material the surface area of contact, A, and the temperature gradient dT/dx. To achieve speedier, more efficient transfer of temperature information (heat), the heat conducting fastener preferably is formed from a material having a value of k of at least 0.1. Although k values for gases range from 0.1 to less than 0.01, the range is 0.1 to 10 for liquids and 1 to 10 for nonmetallic solids. As understood by those skilled in the art, the most efficient temperature information transfer results, however, are achieved by using a metallic fastener: the heat conductivity coefficient, k, of such material will be at least 100.

As perhaps best shown in FIGS. 3 and 4, the temperature information transfer can be efficiently effected by having the light window 61, 71 supported by a heat conducting fastener 18 (preferably, a metal) attached to a surface portion 33 of an electrical system component. To further enhance its temperature information conveying property, the heat conducting light window fastener 18 as illustrated in FIGS. 3 and 4, can have a relatively wide end attached to the electrical system component and a relatively narrower end attached to the light window 61, 71. The wide end provides a larger surface area of contact thereby permitting more ready transfer of temperature information to the heat conducting fastener 18. The temperature information, in the form of energy or heat, is channeled to the narrow end of the fastener so as to affect the connected light window. The shape so described permits the transfer of temperature information with preselected confines which can be purposely chosen so as to enhance the speed and efficiency of transfer of temperature information.

Any number of fastener shapes besides the generally wedge-shaped one illustrated in FIGS. 3 and 4 can be used as will be understood by those skilled in the art. Further, the light window can be supported within a conventional frame that, if made of heat conducting material, would yield a comparable result. Moreover, there is no necessity for having the light window supported by a heat conducting fastener or frame. Rather, as perhaps best seen in the embodiment of FIGS. 5 and 6, the light window 61, 71 could be independently supported by a non-conductive piece 19. Many other such pieces will easily come to mind for those skilled in the art. The temperature information may, nonetheless, be rapidly and efficiently conveyed as described above by linking the electrical system component and the light window with a heat conducting piece 21 as illustrated in FIGS. 5 and 6.

Figure 5:
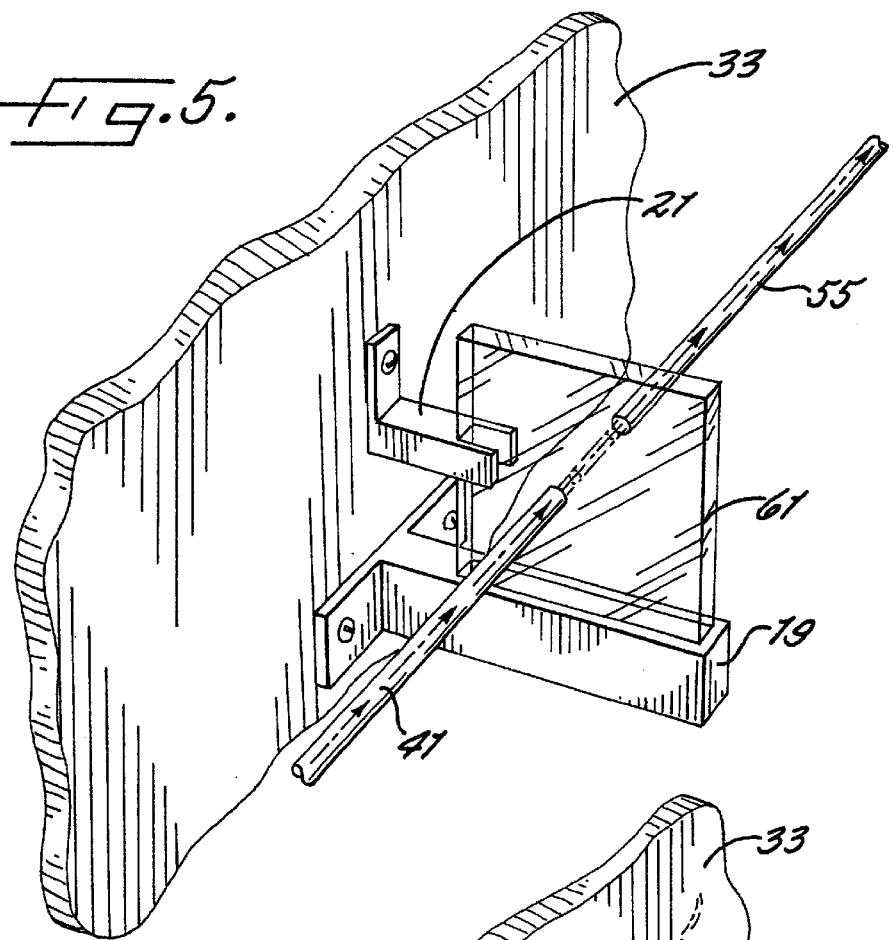
FIG. 5 is a fragmentary perspective view of a light window adjacent a component of an electrical generator system and being directly connected to a heat conductor that is connected to the component according to the present invention.
Figure 6:
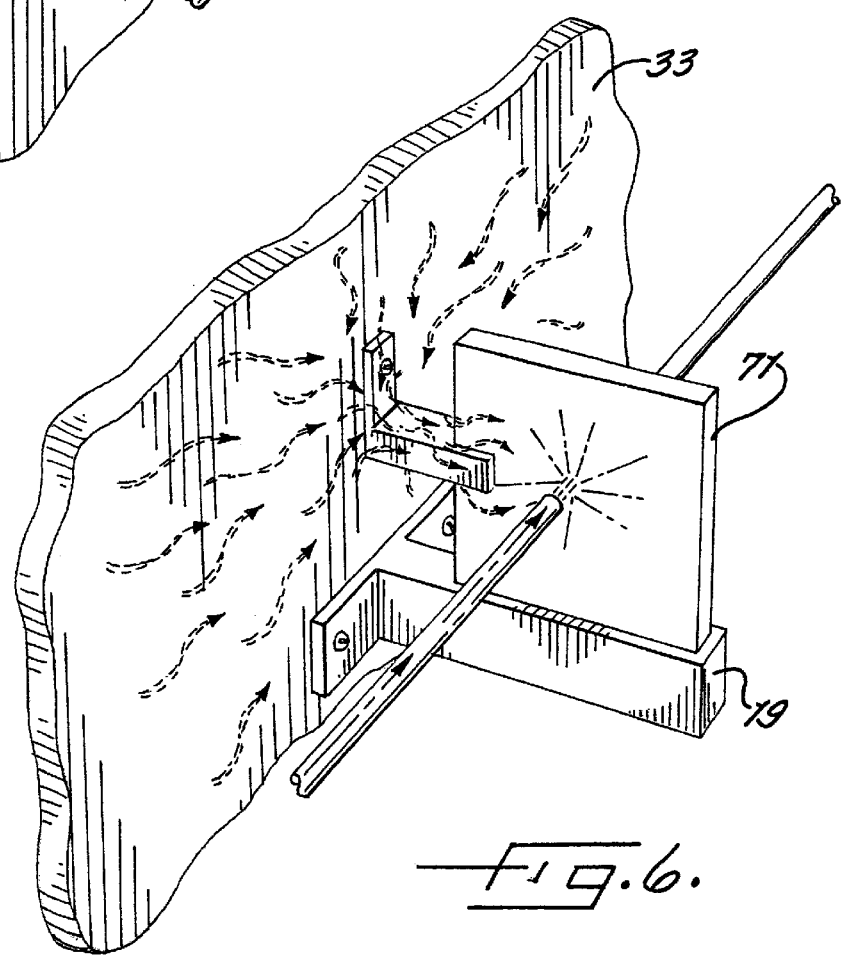
FIG. 6 is a fragmentary perspective view of a light window adjacent a component of an electrical generator system and being directly connected to a heat conductor that is connected to the component according to the present invention.

More generally, as illustrated in FIGS. 3 and 4, and separately in FIGS. 5 and 6, if the light window 61, 71 is, for example, a liquid crystal, heat will be transferred rapidly and directly so as to make the otherwise transparent light window 61, 71 opaque. In an opaque condition, the light window 71 blocks light being conveyed by the first light guide 41 from the light source 10. Light that would otherwise pass through when the light window is transparent is no longer available for capture by the second light guide 55. The absence of light is sensed by the light sensor 11 and the information is processed by the light sensor processor. Other embodiments will be readily apparent as well. Specifically, any combination of signaling a temperature variation either by light passing through or being blocked by the light window at any specific temperature range can be effected by an appropriate choice of light window material responsive to temperature.

Not only are temperature variations in the component more rapidly communicated as compared with conventional monitoring methods by using the present invention, but the ability to convey directly temperature information from each of a plurality of system components to distinct light windows allows for the simultaneous monitoring of individual components as opposed to simply monitoring the aggregate or ambient temperature of the environment of the electrical system. For example, with reference to FIG. 2, each of the plurality of light windows 61, 62, 63, 64 and each corresponding pair of light guides 41, 55; 42, 56; 43, 57; 44, 58 can be fastened to or otherwise positioned adjacent a different component of the electrical generator system 30. Given any variations in the function and structure of individual components, this feature can be critical because the average temperature of the total electrical generator system may be in a state of flux while individual component temperatures vary one from another. A major advantage, then, of the apparatus is to permit temperature monitoring of each and every individual component with a separate temperature probe (i.e., light window and light guide pair in communication with light source and light sensor) that rapidly registers temperature variations at each component being monitored.

Alternatively, and again with reference to FIG. 2, any two light windows of the plurality of light windows 61, 62, 63, 64 and two corresponding pairs of light guides from among 41, 55; 42, 56; 43, 57; 44, 58 can also be fastened to the same component of the electrical generator system 30. Thus, a false-read safeguard is achieved whereby each of the two light windows may operate as an indicator and a confirmation indicator so as to provide confirmation of a particular temperature state, as when both light window conditions signal a temperature variation By coupling the capabilities of multiple temperature probes with that of a programable or other processor 25, one is able not only to detect temperature variations, but moreover to identify which among a plurality of components forming an electrical generator system 30 are experiencing such variation. This provides a unique capability for monitoring not found in other devices or methods. Alternatively, the present invention can in a simplified version provide significant monitoring capabilities merely by linking the light sensor to a signal alarm 25'. Thus, when light from a second light guide is blocked, an alarm is triggered. Even in this streamlined version of the present invention, a more rapid, more efficient capability of detecting temperature variation is achieved. In the context of an electrical generator system 30, this capability can provide the best way for quickly and economically detecting an overheating condition, for example, in the system.

A method aspect of the present invention illustrated in FIGS. 1–6 comprises the steps of conveying light to a light window, wherein the light window permits the passage of light depending on the temperature of the light window, capturing light passing through the window, and conveying temperature variation information in response to changes in the amount of light passing through the window. In order to enhance the accuracy of the temperature variation information conveyed, as well as the speed and efficiency with which such information is so conveyed, the method further comprises the step of directly conducting heat from an electrical system component to the light window so as to affect the temperature and hence the amount of light passing through the light window. Direct conveyance of such temperature variation information can be effected, for example, by transferring temperature information between the electrical generator system component and the light window by using a thermal conducting intermediary. The intermediary preferably is a material having a heat conducting coefficient greater than 0.1, so as to rapidly transfer heat from the electrical generator system component to the light window.

These and other valuable uses of the present invention will come to mind for those skilled in the relevant art. Indeed, many modifications and other embodiments will come to the mind of one skilled the art and having the benefit of the teachings present in the foregoing descriptions and the associated drawings. Therefore, it is to be understood that the invention is not to be limited to the specific embodiments disclosed herein, and that the modifications and alternative embodiments are intended to be included within the scope of the appended claims.

What is claimed is:

1. An apparatus for detecting a temperature variation in a component of an electrical generator system, the apparatus comprising:

a light source;

a light window positioned adjacent the electrical generator system and comprising a variably opaque material responsive to the temperature variation;

a light sensor;

a pair of light guides corresponding to the light window, the pair of light guides comprising a first light guide having a first end positioned adjacent the light source and a second end positioned adjacent the light window so as to convey light emitted from the light source to the light window, and a second light guide having a first end positioned adjacent the light window and a second end positioned adjacent the light sensor so as to capture light emitted from the light source and to convey the captured light to the light sensor; and a heat conductor having a first portion connected to the light window and a second portion connected to the component of the electrical generator system, wherein the heat conductor has a thermal conductivity coefficient greater than 0.1.

2. An apparatus as defined in claim 1 wherein the heat conductor comprises a metal.

3. An apparatus as defined in claim 1 wherein the light window is opaque to light when the temperature of the window is within a pre-selected temperature range and otherwise transparent to light when the temperature of the window is outside the pre-selected temperature range.

4. An apparatus as defined in claim 3 wherein the light window includes a cholesteric liquid crystal.

5. An apparatus as in claim 1 wherein the heat conductor includes a frame and the light window is supported within the frame such that the frame conveys temperature variation information to the light window.

6. An apparatus as in claim 1 wherein the heat conductor has a first end connected to and supporting the light window and a second end attached to the component, wherein the second end is wider than the first end.

7. An apparatus as defined in claim 1 further comprising a second light window for permitting confirmation of the temperature variation and reducing associated risk of a false reading of the temperature variation for the component being monitored.

8. An apparatus as defined in claim 7 further comprising a light sensor processor for processing information received from the light window and the second light window to indicate in which component the temperature variation has occurred.

9. A method for monitoring a temperature of a component of an electrical generator system, the method comprising the steps:

conveying light from a light source to a light window adjacent to the component of the electrical generator system;

conducting heat from the component of the electrical generator system to the light window via a heat conductor with a thermal conductivity coefficient greater than 0.1; and monitoring the conveyed light that passes through the light window to determine the temperature of the component of the electrical generator system.

10. A method as described in claim 9 wherein the method further comprises the step of capturing light passing through the light window and conveying a signal depending on whether light is passing through the window.

11. A method as described in claim 10 wherein the step of conveying light further comprises conveying said light to an at least one light window that is opaque to light when the temperature of the light window is within a pre-selected range thereby registering whether temperature is within the pre-selected range.

\* \* \* \* \*